US009370268B2

(12) United States Patent  (10) Patent No.: US 9,370,268 B2
Van Groesen  (45) Date of Patent: Jun. 21, 2016

(54) HOOK DEVICE FOR HANGING OBJECTS

(71) Applicant: Jan Van Boxtel Artitec B.V., Tilburg (NL)

(72) Inventor: Wilhelmus Maria Van Groesen, Tilburg (NL)

(73) Assignee: JAN VAN BOXTEL ARTITEC B.V., Tilburg (NL)

( * ) Notice: Subject to any disclaimer, the term of this patent is extended or adjusted under 35 U.S.C. 154(b) by 0 days.

(21) Appl. No.: 14/407,453

(22) PCT Filed: Jun. 19, 2013

(86) PCT No.: PCT/NL2013/050433
§ 371 (c)(1),
(2) Date: Dec. 11, 2014

(87) PCT Pub. No.: WO2013/191544
PCT Pub. Date: Dec. 27, 2013

(65) Prior Publication Data
US 2015/0182040 A1  Jul. 2, 2015

(30) Foreign Application Priority Data

Jun. 19, 2012 (NL) .................................... 2009029

(51) Int. Cl.
*A47H 1/10* (2006.01)
*A47G 1/16* (2006.01)
(Continued)

(52) U.S. Cl.
CPC .............. *A47G 1/1686* (2013.01); *A47G 1/202* (2013.01); *F16G 11/108* (2013.01); *Y10T 29/49844* (2015.01)

(58) Field of Classification Search
CPC .... F21V 21/16; Y10T 24/3993; F16G 11/108
USPC ......... 248/693, 489, 492, 493, 320, 321, 322, 248/327, 328, 925, 551, 617, 491, 339; 24/136 A; 340/568.1
See application file for complete search history.

(56) References Cited

U.S. PATENT DOCUMENTS 700,412 A * 5/1902 Fischer ........................... 279/75
1,450,094 A * 3/1923 Lustgarten .................. 24/136 A
(Continued)

OTHER PUBLICATIONS

International Search Report in priority application PCT/NL2013/050433 mailed Aug. 6, 2013.
(Continued)

*Primary Examiner* — Terrell McKinnon
*Assistant Examiner* — Michael McDuffie
(74) *Attorney, Agent, or Firm* — Troutman Sanders LLP; Ryan A. Schneider; Daniel T. Sharpe

(57) ABSTRACT

A hook device (2) for hanging objects such as picture frames comprises a housing (10) which has an internal space for allowing a carrier for the hook device (2) to extend through the housing (10), and which is normally provided with a projection designed for functioning as a hanging hook. The hook device (2) further comprises a clamping mechanism for fixing the housing (10) on a carrier, wherein the clamping mechanism comprises a first hollow cylinder (20) having a tapered inner surface (21), which is retained in the housing (10) in an axial direction by form closure. During the assembling process of the hook device (2), the first hollow cylinder (20) is inserted into the housing (10) by moving the cylinder (20) through an opening (17) in a radial direction, different from other elements (30, 40, 50) of the hook device (2), which are moved in an axial direction.

15 Claims, 4 Drawing Sheets

(51) Int. Cl.
*F16G 11/10* (2006.01)
*A47G 1/20* (2006.01)

(56) References Cited

U.S. PATENT DOCUMENTS

| | | | | |
|---|---|---|---|---|
| 4,141,117 | A | * | 2/1979 | Van Gompel ............... 24/136 R |
| 4,656,698 | A | * | 4/1987 | Arakawa .................... 24/136 A |
| 4,681,356 | A | * | 7/1987 | Brammall ............... F16G 11/04 |
| | | | | 24/115 G |
| 5,058,847 | A | * | 10/1991 | Arakawa ...................... 248/328 |
| 5,359,870 | A | * | 11/1994 | Reutlinger ................. 70/456 R |
| 5,417,400 | A | * | 5/1995 | Arakawa ...................... 248/323 |
| 5,638,049 | A | * | 6/1997 | Arakawa ................... 340/568.8 |
| 5,914,658 | A | | 6/1999 | Arakawa |
| 7,073,754 | B2 | * | 7/2006 | Shuey ............................. 248/72 |
| 7,190,272 | B2 | * | 3/2007 | Yang .................. G08B 13/2434 |
| | | | | 340/568.1 |
| 7,657,976 | B2 | * | 2/2010 | Nakamura .................. 24/136 A |
| 2004/0026593 | A1 | * | 2/2004 | Fay ................................ 248/489 |
| 2005/0006910 | A1 | * | 1/2005 | Foigel .................. B65D 90/008 |
| | | | | 292/315 |
| 2008/0035820 | A1 | * | 2/2008 | Johnson ........................ 248/322 |

OTHER PUBLICATIONS

Netherlands Search Report in related application NL2009029 mailed Feb. 5, 2013.

* cited by examiner

HOOK DEVICE FOR HANGING OBJECTS

CROSS-REFERENCE TO RELATED APPLICATIONS

This application is a US National Stage of International Application No. PCT/NL2013/050433, filed 19 Jun. 2013, which claims the benefit of NL Application No. 2009029, filed 19 Jun. 2012, both herein fully incorporated by reference.

The invention relates to a hook device for hanging objects, comprising a housing which has an internal space for allowing a carrier for the hook device to extend through the housing, and a clamping mechanism for fixing the housing on a carrier, wherein the clamping mechanism comprises a hollow cylinder having a tapered inner surface.

A hook device as mentioned is known in practice. In general, the hook device is suitable to be used with a rail which is attached to a ceiling or a wall, and a carrier for the hook device which normally comprises a wire having an element at one end thereof for connecting the carrier wire to the rail and suspending the carrier wire from the rail. By means of the hook device, an object such as a picture frame can be connected to the carrier wire. To that end, the hook device is clamped on the carrier wire, and the object is hung on a hanging hook which is part of the hook device. For the purpose of allowing the carrier wire to extend through the hook device, the housing and other elements of the hook device are provided with a through-hole, such that an overall through-hole is realized in the hook device.

In a known embodiment of the hook device, the clamping mechanism of the hook device comprises a second hollow cylinder, which is movably arranged in the housing in an axial direction, which extends through the first hollow cylinder, and which is equipped with openings which provide access to an internal space of the second hollow cylinder from outside of the second hollow cylinder in a radial direction, wherein the clamping mechanism also comprises balls which are located in the openings of the second hollow cylinder, and a coil spring for biasing the second hollow cylinder in an axial direction, in a direction in which the inner surface of the first hollow cylinder converges.

For sake of clarity, it is noted that a hollow cylinder is a commonly known object. A practical example of a hollow cylinder is a length of pipe. When terms like "axial direction" and "radial direction" are used in this text, the terms are supposed to be related to a cylinder shape in a usual manner. Consequently, the "axial direction" is a direction in which a longitudinal axis or an axis of rotation symmetry of the cylinder extends, and the "radial direction" is a direction in an imaginary plane perpendicular to the longitudinal axis or the axis of rotation symmetry, intersecting with the axis.

For releasing the clamping mechanism, the hook device comprises an actuating element which is movably arranged with respect to the housing, and which is in contact with the second hollow cylinder to establish a movement of the second hollow cylinder in an axial direction in case of actuation by a user, against the action of the coil spring. The actuating element has elongated arms, and the housing is equipped with spaces, wherein an internal surface of the spaces is provided with a step, and wherein ends of the arms of the actuating element are provided with thickened portions which engage the steps in the housing in a non-actuated position of the actuating element, under the influence of the coil spring. On the basis of this configuration, the actuating element is prevented from falling out of the housing, as the thickened portions cannot move beyond the steps. Preferably, the actuating element has resilient properties, to such an extent that during assembly of the hook device, when the arms are moved deeper and deeper in the spaces of the housing, the arms are deformed a little until the thickened portions have passed the steps and the arms can assume their original shape again.

In the hook device as described in the foregoing, a clamping action involves a configuration of the balls in which they are pressed against a carrier wire. Such a configuration is obtained on the basis of the fact that the coil spring urges the second hollow cylinder to move in the same direction as the direction in which the inner surface of the first hollow cylinder converges. Due to this fact, the balls, which are positioned at the circumference of an imaginary circle around a longitudinal axis of the second hollow cylinder, are urged to move in a direction in which available space decreases. In a situation in which a carrier wire extends through the hook device, the balls are kept in a position in which they are pressed between the tapered inner surface of the first hollow cylinder on the one hand and the carrier wire on the other hand. In this situation, the carrier wire and the hook device cannot be moved with respect to each other in a longitudinal direction of the carrier wire as long as a force exerted on the hook device by means of an object hanging from the hook device does not exceed a maximum which is determined by the pressing forces of the balls exerted on the carrier wire.

For the purpose of releasing the clamping mechanism of the hook device, so that a carrier wire and the hook device can be moved with respect to each other, the actuating element needs to be moved to an actuated position. In this position, pressure is exerted on the second hollow cylinder by means of the actuating element, against the action of the coil spring. As a result, the second hollow cylinder moves in a direction in which the inner surface of the first hollow cylinder diverges. In the process, the balls are granted more space, and grip of the balls on the carrier wire is lost. As soon as the actuating element is no longer subjected to pressure, the position of the second hollow cylinder and the balls is determined by the coil spring again, wherein the balls are moved to a position of decreased space inside the first hollow cylinder. Thus, in general, the clamping mechanism applies a set of balls which are carried by a hollow cylinder moving through the internal space of another hollow cylinder, wherein space for the balls increases and decreases depending on a mutual position of the cylinders, so that a space encompassed by the balls, which is the space where a carrier wire can be inserted, increases and decreases.

In the known hook device, an outer surface of the second hollow cylinder is tapered at the position where the balls are present and where the second hollow cylinder is surrounded by the first hollow cylinder. A direction in which the outer circumference of the second hollow cylinder decreases is the same as a direction in which the inner surface of the first hollow cylinder converges. In a default position, i.e. a position in which the actuating element is in a non-actuated position, the outer surface of the second hollow cylinder contacts the inner surface of the first hollow cylinder. On the basis of the particular shapes of the surfaces as mentioned, a maximum is determined for the position which can be reached by the second hollow cylinder under the influence of the coil spring. The first hollow cylinder is kept in place inside the housing by means of screw thread, wherein the first hollow cylinder is provided with external screw thread, and wherein the housing is provided with internal screw thread. During assembly of the hook device, the coil spring, the second hollow cylinder and the balls are inserted into the housing first. Subsequently, the first hollow cylinder is slid over the second hollow cylinder until the first hollow cylinder reaches a position where it is inserted between the second hollow cylinder and the housing. At that point, the first hollow cylinder is connected to the housing under the influence of a rotating movement of the first hollow cylinder and the housing with respect to each other, wherein external screw thread of the first hollow cylinder and internal screw thread of the housing engage with each other. As soon as the first hollow cylinder is in the right position inside the housing, the second hollow cylinder and the coil spring are prevented from falling out of the housing. A last step of the process of assembling the hook device involves arranging the actuating element on the housing by inserting the arms of the actuating element into the spaces of the housing which are intended for receiving those arms and moving the arms deeper and deeper inside the housing until a snapping action is realized and thickened portions which are present at the ends of those arms are located behind steps inside the spaces.

It is noted that variants of the known hook device exist in which the first hollow cylinder is free from external screw thread. In such variants, an additional piece having external screw thread is applied, wherein the additional piece is connected to the housing after the first hollow cylinder and other elements of the hook device have been inserted into the housing during an assembling process of the hook device, so that the first hollow cylinder is retained in the housing after all. Hence, in such variants, the housing still needs to be provided with internal screw thread. It is also possible that an additional piece is connected to the housing in another way than by screwing the piece in the housing, for example, by pressing the piece in the housing. In any case, tools need to be used and force needs to be applied to realize a final state of the hook device in which the first hollow cylinder is retained in the housing and none of the other elements can fall out of the housing.

The known hook device is easy to use and has a reliable performance. When a user wants to have a connection between the hook device and a carrier wire, all that the user needs to do is exert pressure on the actuating element and keep the actuating element in an actuated position while inserting the carrier wire through the hook device and moving the carrier wire and the hook device with respect to each other until a desired mutual position is obtained. As soon as the user releases the actuating element, the clamping mechanism of the hook device is actuated, wherein pressure is exerted on the carrier wire by means of the balls of the clamping mechanism. In general, the design of the hook device is such that a default position of the hook device is a position in which the clamping mechanism actually performs a clamping action. By means of the actuating element, a user of the hook device can choose to release the clamping mechanism in order to realize a situation in which a carrier wire can be inserted into the hook device or removed from the hook device, and/or a situation in which a mutual position of a carrier wire and the hook device can be adjusted according to desire.

Even though the known hook device is a reliable and user-friendly article, there is a need for improvement. The application of screw thread adds to complexity of the manufacturing process of the hook device and the costs of the hook device. Another factor adding to the costs of the hook device is the fact that the elements of the hook device are made of a metal or a metal alloy, for example, brass. In particular, the housing of the hook device needs to made of relatively strong material so that the screw thread connection between the first hollow cylinder and the housing can withstand the forces which are exerted on the clamping mechanism of which the first hollow cylinder is part by means of an object which is supported by the hook device.

It is an objective of the invention to provide a hook device which is easier to manufacture and which is cheaper than the known hook device. The objective is achieved by a hook device in which the first hollow cylinder is retained in the housing in an axial direction by form closure. In this way, a very reliable connection between the first hollow cylinder and the housing is obtained, wherein there is no need for screw thread, and wherein it is not necessary to use a relatively strong material such as a metal (alloy) in the housing. According to an insight underlying the invention, it is possible to let go of the concept of inserting both hollow cylinders and the coil spring of the clamping mechanism into the housing in a similar direction, which is an axial direction of the cylinders and the spring. It is an achievement of the invention that another possibility is recognized, which involves inserting the first hollow cylinder into the housing in a radial direction before the second hollow cylinder is inserted. An advantageous effect is that it is possible to realize a connection between the first hollow cylinder and the housing which is based on form closure. In this respect, the fact that the first hollow cylinder is retained by form closure in an axial direction is relevant, as a force which is exerted when an object is supported by the hook device acts in that very direction, and the same is applicable to a biasing force which is exerted on the second hollow cylinder, and also to a force which is exerted on the second hollow cylinder in an opposite direction when the clamping mechanism is released.

Furthermore, it is an achievement of the invention that a possibility of adding a function to the actuating element is recognized. In particular, it has been found that the actuating element can be used for securing the second hollow cylinder against falling out of the housing. Therefore, there is no longer a need for the first hollow cylinder to perform this function. Furthermore, the second hollow cylinder does no longer need to have a tapered portion of the outer surface, wherein it is possible to have a design of the second hollow cylinder in which an outer diameter of the second hollow cylinder is constant along a length of the second hollow cylinder. Needless to say that such a relatively simple design involves a reduction of costs.

In order to be capable of allowing the first hollow cylinder to be put in place inside the housing in another manner than in the known hook device during the manufacturing process, it is practical if the housing is provided with an opening at the position of the cylinder. Once the first hollow cylinder had been inserted into the housing through such an opening, a portion of an outer surface of the first hollow cylinder is accessible from outside of the housing, through the opening. Within the framework of the invention, it is possible to close the opening in any suitable way once the first hollow cylinder is arranged inside the housing, but it is also possible to omit an application of closing means and keep the number of elements of the hook device at a minimum.

On the basis of the fact that the nature of the connection between the housing and the first hollow cylinder is determined by form closure, the housing can be free from internal screw thread, and the housing can be manufactured from plastic instead of a metal (alloy), so that costs can be saved. Still, it is preferred for the two hollow cylinders of the clamping mechanism to comprise metal in view of the fact that both cylinders are in direct contact with the balls.

All in all, when the invention is applied, a hook device is obtained which does not deviate from the known hook device as far as the way in which it should be handled by a user is concerned. Hence, a user who is already familiar with the known hook device is ready to apply the hook device according to the present right away. Furthermore, the way in which the clamping mechanism of the hook device functions is not changed, so that reliability of the connection of the hook device to a carrier is not compromised. Thus, it can be concluded that the invention solves the problems associated with the known hook device without introducing new disadvantages. Due to the new way in which the first hollow cylinder is designed and introduced into the housing, wherein the housing is provided with a new, additional opening for receiving the first hollow cylinder and allowing the first hollow cylinder to reach the correct position inside the housing, the hook device can be cheaper, and the manufacturing process can be simplified.

The invention also relates to a method for assembling a hook device for hanging objects, wherein a housing which has an internal space for allowing a carrier for the hook device to extend through the housing is provided, wherein further a first hollow cylinder having a tapered inner surface, a second hollow cylinder and a number of balls which are located in openings of the second hollow cylinder, a spring element, and an actuating element having elongated arms are provided, wherein the first hollow cylinder is inserted into the housing through an opening in the housing, wherein the spring element and the second hollow cylinder with the balls are successively inserted into the housing through another opening in the housing, and wherein the arms of the actuating element are inserted into the housing in yet other openings in the housing.

Particularly, according to the invention, it is advantageous if the first hollow cylinder is moved in a radial direction in the process of insertion into the housing. This enables a construction in which the first hollow cylinder can be retained in the housing by form closure in another direction, especially an axial direction.

In a practical way of assembling the hook device, the first hollow cylinder is inserted into the housing through a movement in a first direction with respect to the housing, and the spring element, the second hollow cylinder with the balls, and the arms of the actuating element are successively inserted into the housing through a movement in a second direction with respect to the housing. For sake of completeness, it is noted that the second direction deviates from the first direction, wherein the second direction can be perpendicular to the first direction.

The invention will be explained in more detail on the basis of the following description of a hook device for hanging objects and a method for assembling the hook device during the manufacturing process of the hook device, wherein a comparison will be made to a known hook device and a method for assembling the known hook device in order to indicate particular aspects of the invention. Reference will be made to the drawing, in which equal reference numerals indicate equal or similar parts, and in which:

FIG. 1 shows a hook device 1 according to the prior art. The various elements of the hook device 1 are separately shown in the exploded view of FIG. 2.

Figure 3:
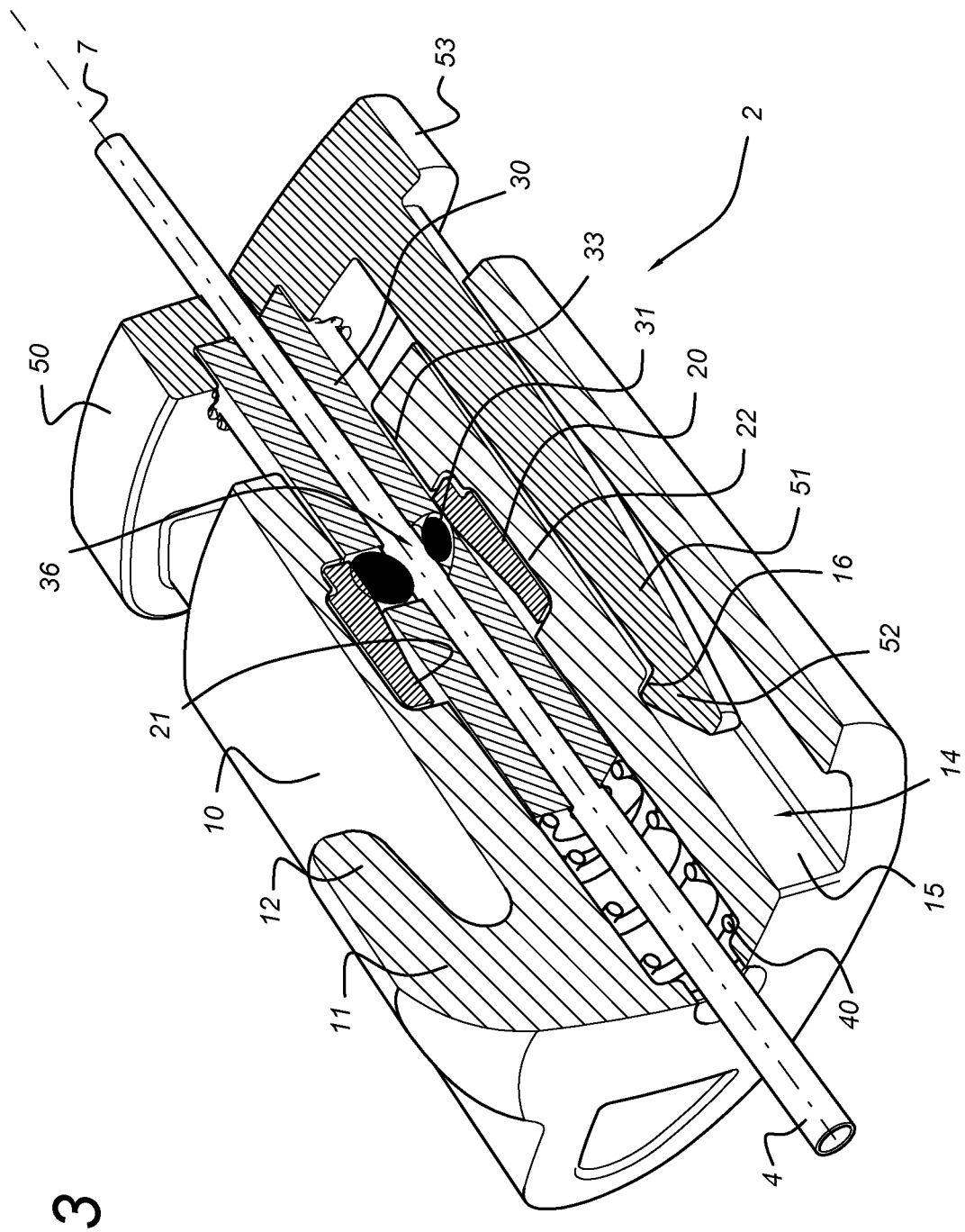
FIG. 3 shows a perspective view of a hook device according to the invention, with a section of the hook device being cut away so that a portion of an interior of the hook device can be seen, and further shows a portion of a carrier wire extending through the hook device.
Figure 4:
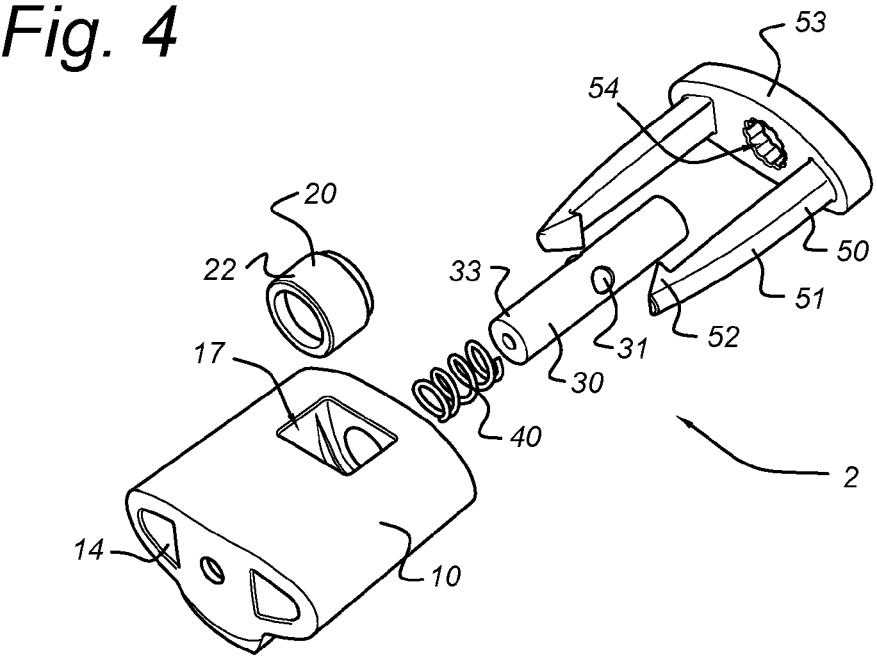
FIG. 4 shows an exploded view of the hook device according to the invention.
Figure 5:
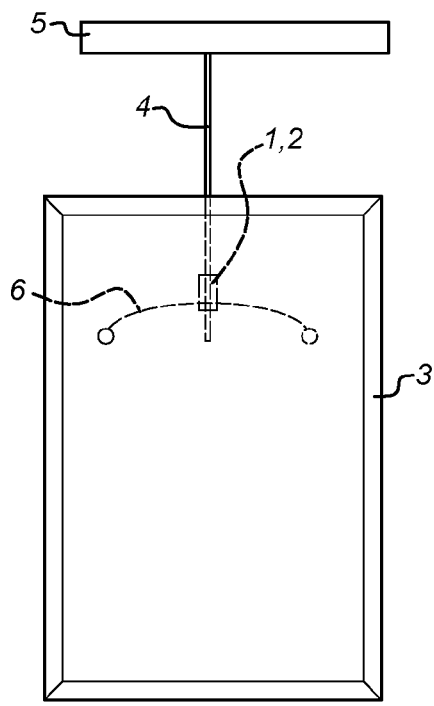
FIG. 5 illustrates how a hook device can be used for coupling an object to a carrier wire hanging down from a rail.

Furthermore, FIG. 3 shows a hook device 2 according to the invention, whereas the various elements of the hook device 2 are separately shown in the exploded view of FIG. 4. FIG. 5 illustrates how a hook device, which may be a known hook device 1 or a hook device 2 according to the invention, can be used for coupling an object 3 to a carrier wire 4 hanging down from a rail 5.

With reference to FIG. 5, it is noted that in general, a hook device 1, 2 is intended to be used for coupling an object 3 such as a picture frame to a carrier wire 4 and fixing the mutual position of the object 3 and the carrier wire 4. Usually, the carrier wire 4 is vertically oriented. Furthermore, the carrier wire 4 may be made of any suitable material for carrying the object 3, including metal or a synthetic material such as perlon. A rail 5 is used with the carrier wire 4, wherein an end of the carrier wire 4 is provided with an element (not shown) for coupling the carrier wire 4 to the rail 5 in such a way that the vertical position of the carrier wire 4 is fixed while a sideward displacement of the carrier wire 4, i.e. a displacement in a horizontal direction, is possible. The rail 5 can be attached to an upper side of a wall, for example, so that the object 3 can be positioned against the wall. The object 3 can have a wire 6 or can be provided with an opening, for example, for allowing the object 3 to be coupled to the hook device 1, 2. In general, an advantage of using the hanging arrangement comprising the rail 5, the carrier wire 4, and the hook device 1, 2 is that there is no need to use screws or other means for supporting an object 3 on a wall, so that damage to the wall is prevented and the position of the object 3 can be easily varied according to desire.

In the following description, for sake of clarity, a normal orientation of the hook device 1, 2 is assumed, i.e. an orientation which is associated with the arrangement of the hook device 1, 2 on a vertical carrier wire 4, in which a free end 12 of a hook-like projection 11 of the hook device 1, 2 is oriented upwardly.

Figure 1:
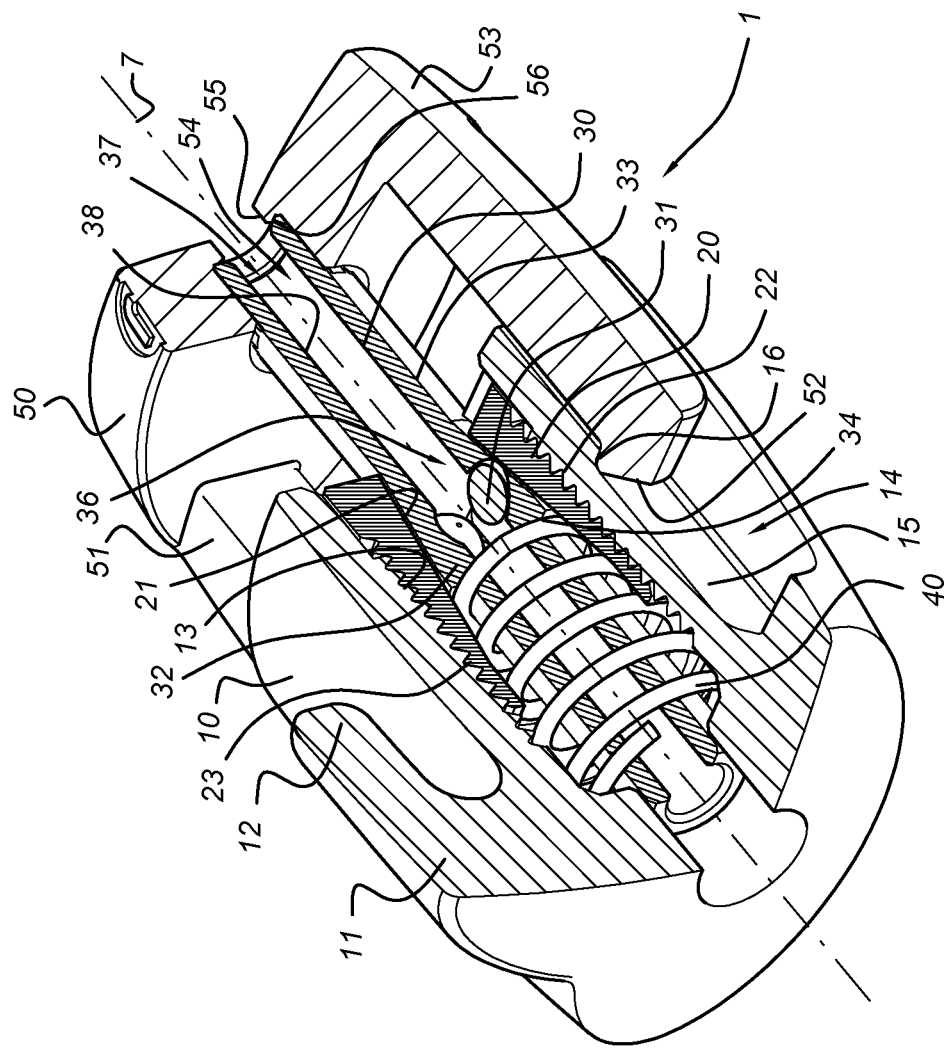
FIG. 1 shows a perspective view of a hook device according to the prior art, with a section of the hook device being cut away so that a portion of an interior of the hook device can be seen.
Figure 2:
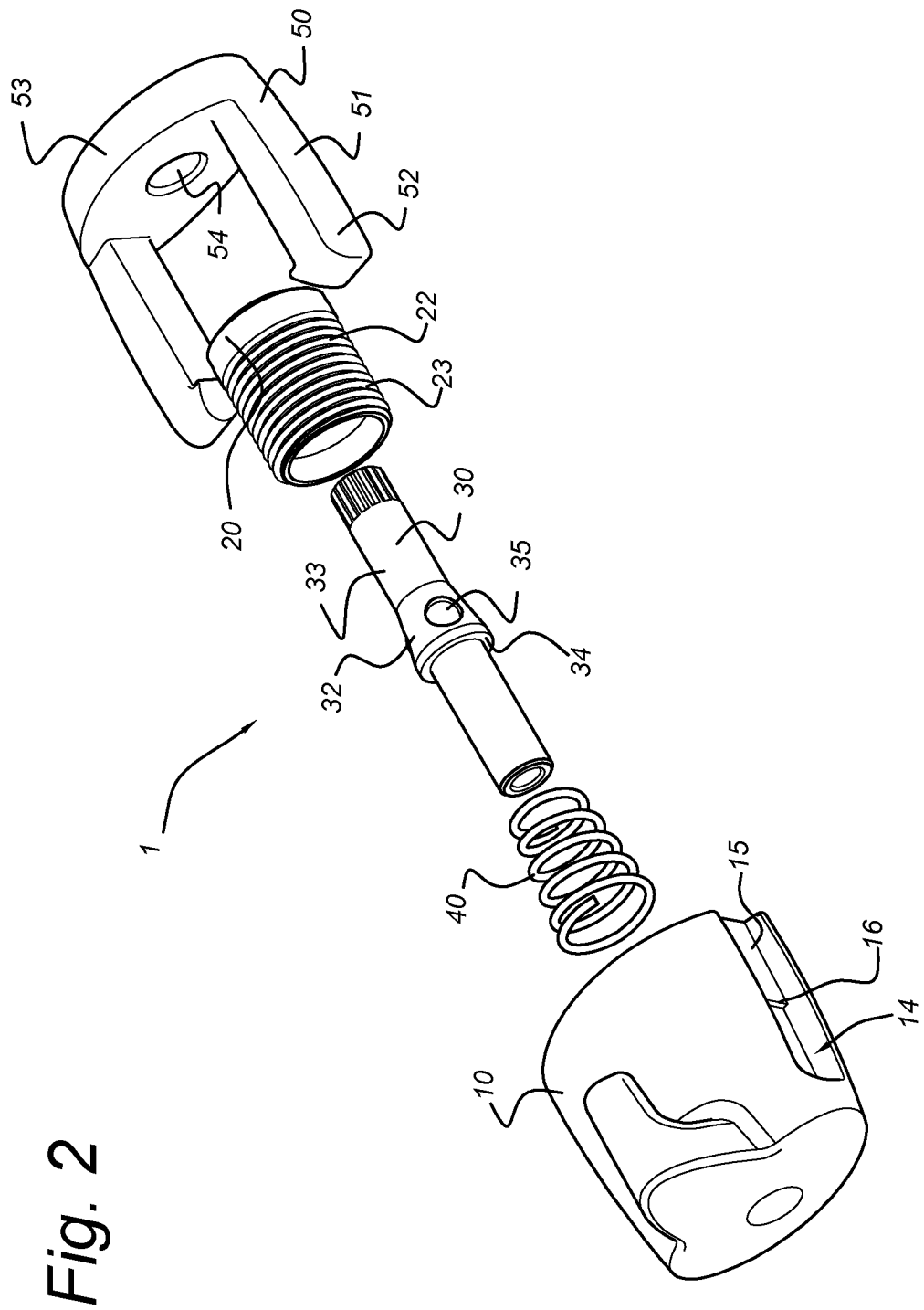
FIG. 2 shows an exploded view of the hook device according to the prior art.

With reference to FIGS. 1 and 2, in order to explain the background of the invention, a description of the known hook device 1 will now be given.

As clearly shown in FIG. 2, the hook device 1 comprises a number of components. In the first place, the hook device 1 comprises a housing 10. The hook-like projection 11 mentioned earlier projects from an outer surface of the housing 10. Furthermore, the housing 10 has various spaces for accommodating other components of the hook device 10. In the second place, the hook device 1 comprises a number of components which are part of a mechanism for fixing the housing on a carrier wire 4 by means of a clamping action, namely a first hollow cylinder 20, a second hollow cylinder 30, a number of balls 31, and a coil spring 40. In the third place, the hook device 1 comprises an actuating element 50 which is adapted to allow a user of the hook device 1 to release the clamping mechanism.

Figure 6:
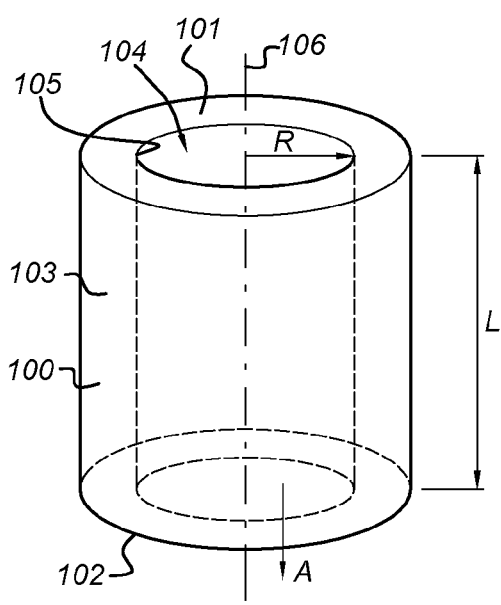
FIG. 6 illustrates the general concept of a hollow cylinder and directions which are defined within that concept.

FIG. 6 serves to illustrate the general concept of a hollow cylinder. To that end, the figure shows a hollow cylinder 100, including shape lines of the cylinder 100 which are actually not visible in the orientation of the cylinder 100 as shown in the figure, as if the cylinder 100 were transparent, wherein these shape lines are depicted as dashed lines. The hollow cylinder 100 can be considered as being a ring with a certain length L. In the shown example, ring-shaped end faces 101, 102 of the cylinder are planar, whereas an outer surface 103 of the cylinder 100 extending between the end faces 101, 102 has a circular circumference. An inner space 104 of the cylinder 100 is delimited by a curved inner surface 105 of the cylinder 100, which, in the shown example, has a circular circumference as well.

An axis of rotation symmetry, which is a longitudinal axis of the cylinder 100 extending at a central position through the inner space 104 of the cylinder 100, is depicted as a dot and dash line and indicated by means of reference numeral 106. Where a direction is denoted as being an axial direction in this text, reference is made to the direction in which the longitudinal axis 106 of the cylinder 100 extends. This direction is indicated in FIG. 6 by means of an arrow A. A radial direction is a direction in an imaginary plane perpendicular to the longitudinal axis 106, and is indicated by means of an arrow R. When the definitions provided in the foregoing are applied, it is clear that when the hollow cylinder 100 is moved in the axial direction, the position of the longitudinal axis 106 does not change. In the terms of the orientation of the cylinder 100 as shown in FIG. 6, it can be said that a movement in the axial direction is a movement up or down along the longitudinal axis 106. Contrariwise, a movement in the radial direction involves a chance of the position of the longitudinal axis 106, without tilting the axis 106. Such a movement can also be denoted as being a sideward or lateral movement of the cylinder 100.

The first hollow cylinder 20 has a tapered inner surface 21. In the normal orientation of the hook device 1, the inner surface 21 converges in an upward direction. An outer surface 22 of the first hollow cylinder 20 is provided with external screw thread 23.

The second hollow cylinder 30 has a larger length than the first hollow cylinder 20 and extends through the first hollow cylinder 20 in the assembled condition of the hook device 1 as shown in FIG. 1. A portion 32 of an outer surface 33 of the second hollow cylinder 30 is tapered, to the same extent as the inner surface 21 of the first hollow cylinder 20. In the normal orientation of the hook device 1, the radius of the tapered portion 32 of the outer surface 33 of the second hollow cylinder 30 decreases in an upward direction, i.e. in the same direction in which the inner surface 21 of the first hollow cylinder 20 converges. At a side of the tapered portion 32 of the outer surface 33 of the second hollow cylinder 30 which is a bottom side in the normal orientation of the hook device 1, a step 34 is present in the outer surface 33. At the position of the tapered portion 32 of the outer surface 33, the second hollow cylinder 30 is provided with a number of openings 35 for accommodating the balls 31. In the shown example, the number of openings 35 and the number of balls 31 is three.

In the assembled condition of the hook device 1, the coil spring 40 is located inside the housing 10. A portion of the second hollow cylinder 30 is present inside the housing 10 as well, wherein a bottom portion of the second hollow cylinder extends through the coil spring 40, and wherein the coil spring 40 is retained between a portion of the housing at one end and the step 34 which is present in the outer surface 33 of the second hollow cylinder 30 at another end. Both the coil spring 40 and the second hollow cylinder 30 are prevented from falling out of the housing 10 by means of the first hollow cylinder 20, which is arranged such as to surround the tapered portion 32 of the outer surface 33 of the second hollow cylinder 30, with the balls 31 in place in the openings 35 of the second hollow cylinder 30, and a portion of the coil spring 40 and the second hollow cylinder 30 extending therethrough. The first hollow cylinder 30 is connected to the housing 10 by means of the external screw thread 23, wherein the housing 10 is provided with internal screw thread 13 for engaging with the external screw thread 23 of the first hollow cylinder 20.

Under the influence of the coil spring 40, the second hollow cylinder 30 is pushed in a direction which is an upward direction in the normal orientation of the hook device 1. The second hollow cylinder 30 is retained by the first hollow cylinder 20, wherein the tapered surfaces 21, 32 contact each other. Dimensions of a space 36 which is present between the balls 31 are determined by the position of the second hollow cylinder 30 with respect to the first hollow cylinder 20 in the axial direction. Due to the tapered shape of the inner surface 21 of the first hollow cylinder 20, it is true that in a higher position of the second hollow cylinder 30, i.e. a position in which the second hollow cylinder 30 projects further from the housing 10, the space 36 between the balls 31 is smaller than in a lower position of the second hollow cylinder 30, i.e. a more retracted position of the second hollow cylinder 30, against the action of the coil spring 40. Hence, the dimensions of the space 36 between the balls 31 can be varied by varying a position of the second hollow cylinder 30 in the axial direction.

A process of moving the second hollow cylinder 30 downward in order to increase the space 36 between the balls 31 is denoted as being a process of releasing the clamping mechanism which is constituted by the coil spring 40, the two hollow cylinders 20, 30, and the balls 31. For the purpose of allowing a user of the hook device 1 to perform such a process when desired, the hook device 1 comprises the actuating element 50. In particular, the actuating element 50 comprises elongated arms 51 with thickened portions 52 at their ends. In the shown example, the number of elongated arms 51 is two. The housing 10 has two spaces 14 for receiving the arms 51 of the actuating element 50, wherein an inner surface 15 of the spaces 14 is provided with a step 16. In the assembling process of the hook device 1, after the first hollow cylinder 20, the second hollow cylinder 30 with the balls 31, and the coil spring 40 have been put in place, the actuating element 50 is coupled to the housing 10 by pressing the actuating element 50 on the housing and forcing the arms 51 of the actuating element 50 to move deeper and deeper into the spaces 14 of the housing 10, until the thickened portions 52 of the arms 51 of the actuating element 50 snap behind the steps 16 of the inner surfaces 15 of the spaces 14.

The arms 51 of the actuating element 50 project from a basic portion 53 of the actuating element 50, which has an opening 54 for receiving an end of the second hollow cylinder 30. An inner surface 55 of the basic portion 53 defining the opening 54 is provided with a step 56 which constitutes a stop for the second hollow cylinder 30, so that it is possible for the actuating element 50 to engage with the second hollow cylinder 30 and cause a movement of the second hollow cylinder 30 against the action of the coil spring 40 in case a user exerts pressure on the basic portion 53 of the actuating element 50, in a direction which is a downward direction in the normal orientation of the hook device 1. The position of the steps 16 in the inner surface 15 of the spaces 14 of the housing 10 in which the arms 51 of the actuating element 50 are inserted determines a maximum position of the actuating element 50 with respect to the housing 10. A length of the spaces 14 as mentioned is sufficient to allow for a movement of the actuating element 50 directed towards the housing 10, i.e. a movement for releasing the clamping mechanism.

In an actuated position of the actuating element 50 and an associated released condition of the clamping mechanism, the space 36 between the balls 31 is large enough for allowing a carrier wire 4 to pass through. Apart from the space 36 as mentioned, the hook device 1 has an elongated through-hole which is actually constituted by an inner space 37 of the second hollow cylinder 30, i.e. a space 37 which is delimited by an inner surface 38 of the second hollow cylinder 30. When a carrier wire 4 is inserted through the hook device 1, the carrier wire 4 is made to extend through the hook device 1 at the position of the through-hole as mentioned. When the actuating element 50 is released, the actuating element 50 and the second hollow cylinder 30 move upward under the influence of the coil spring 40. In the process, the balls 31 move along with the second hollow cylinder 30, wherein the space 36 between the balls 31 decreases as the balls 31 are pushed towards each other by means of the tapered inner surface 21 of the first hollow cylinder 20. The process stops when a situation is obtained in which the balls 31 are stuck between the inner surface 21 of the first hollow cylinder on the one hand and the carrier wire 4 on the other hand. At that moment, a clamping action of the clamping mechanism on the carrier wire 4 is realized, as a result of which a mutual position of the housing 10 and the carrier wire 4 is fixed. In the clamped position, a longitudinal axis of the carrier wire 4 coincides with a longitudinal axis 7 of the hook device 1, which coincides with longitudinal axes of the hollow cylinders 20, 30 and the coil spring 40.

With reference to FIGS. 3 and 4, a description of the hook device 2 according to the invention will now be given, wherein the foregoing description of the known hook device 1 will be used as a basis.

Like the known hook device 1, the hook device 2 according to the invention comprises a housing 10, a first follow cylinder 20, a second hollow cylinder 30, a number of balls 31, a coil spring 40 and an actuating member 50. The clamping mechanism of the hook device 2 according to the invention functions in the same way as the clamping mechanism of the known hook device 1, wherein it is noted that the first hollow cylinder 20 of the hook device 1 according to the invention has a tapered inner surface 21 and the balls 31 which are held by the second hollow cylinder 30 ride on this surface whereby a space 36 between the balls is increased or decreased depending on the position of the second hollow cylinder 30 in the axial direction. However, there are some major differences in the design of the known hook element 1 and the design of the hook element 2 according to the invention, as a result of which the latter hook element 2 involves the advantages of a relatively simple assembling process and relatively low costs.

In the first place, the hook device 2 according to the invention is free from screw thread. The first hollow cylinder 20 is a relatively simple cylinder with a smooth outer surface 22, wherein the first hollow cylinder 20 is retained in the housing in the axial direction by form closure, and wherein the two end faces of the first hollow cylinder 20 abut against internal portions of the housing 10. It will be understood that this arrangement of the first hollow cylinder 20 inside the housing 10 is not realized by performing a process of inserting the first hollow cylinder 20 into the housing 10 in the same way as it is done with the known hook device 1. Instead, the housing 10 of the hook device 2 according to the invention is provided with an additional opening 17, and the first hollow cylinder 20 is put in place inside the housing 10 by moving the first hollow cylinder 20 through the opening 17, in a radial direction. The exploded view of FIG. 4 illustrates the positioning of the first hollow cylinder 20 with respect to the housing 10 prior to the assembling process of the hook device 2.

In the known hook device 1, the housing 10 is preferably made of a relatively strong material such as a metal (alloy), so that a reliable connection between the first hollow cylinder 20 and the housing 10 can be guaranteed. However, this is not necessary in the hook device 2 according to the invention, in which there is no screw thread connection, but a connection based on form closure. Therefore, the housing 10 of the hook device 2 according to the invention can be made of a relatively cheap material such as plastic. The housing 10 can be lightweight and wall thicknesses can be relatively small due to the various spaces which are present inside the housing 10, including the spaces 14 for receiving and accommodating the arms 51 of the actuating element 50.

In the second place, the second hollow cylinder 30 of the hook device 2 according to the invention is embodied in a simpler form than the second hollow cylinder 30 of the known hook device 1. In particular, the outer surface 33 does not have a tapered portion 32. Instead, an outer diameter of the second hollow cylinder 30 is simply constant along a length of the second hollow cylinder 30. When the openings 35 are arranged at a position in the second hollow cylinder 30 which is a central position in the axial direction, as is the case in the shown example, it is not necessary to take a certain orientation of the second hollow cylinder 30 into account during the assembling process of the hook device 2, whereby the assembling process is simplified.

In the hook device 2 according to the invention, the first hollow cylinder 1 does not have a function in preventing the second hollow cylinder 30 and the coil spring 40 from falling out of the housing 10. Instead, this function is performed by the actuating element 50.

The assembling process of the hook device 2 according to the invention involves the following steps. First, the first hollow cylinder 20 is inserted into the housing 10 by moving the first hollow cylinder 20 through the additional opening 17, in the radial direction. When the first hollow cylinder 20 is in the correct position, the coil spring 40 and the second hollow cylinder 30 with the balls 31 are successively inserted into the housing 10, in the axial direction. Subsequently, the actuating element 50 is coupled to the housing 10, which also causes the second hollow cylinder 30 to be secured in the housing 10, wherein it is possible for the second hollow cylinder 30 to move in the axial direction along a limited distance, without a risk of falling out of the housing 10. For sake of completeness, it is noted that as an alternative, it is also possible if the coil spring 40 is inserted into the housing 10 first of all, as a possible presence of the coil spring 40 does not hinder insertion of the first hollow cylinder 20.

The assembling process of the hook device 2 according to the invention is simpler than the assembling process of the known hook device 1, due to the fact that there is no need for establishing a screw thread connection. In fact, the entire assembling process can be performed without using a tool, which is not the case in the known situation. Only in respect of the first hollow cylinder 20, it is important to take measures for ensuring that a correct orientation is chosen, which is an orientation with the smallest diameter of the inner surface 21 at a side which is a top side in the normal orientation of the hook device 2. For the purpose of guaranteeing correct assembling, any suitable type of indication may be arranged on the outer surface 22 of the first hollow cylinder 20, which may be a projection at a certain non-central position, for example.

It will be clear to a person skilled in the art that the scope of the invention is not limited to the examples discussed in the foregoing, but that several variations and modifications thereof are possible without deviating from the scope of the invention as defined in the attached claims.

The projection 11 which is arranged on the housing 10 and which is intended to serve as a hanging hook, may have any suitable shape for supporting and retaining a wire 6 or the like arranged on an object 3 to be hung from the hook device 2. In this respect, it is noted that the projection 11 may even be shaped like a knob or the like. A normal orientation of the hook device 2 is an orientation in which the projection 11 is capable of carrying an object 3. In any case, a normal orientation of the hook device 2 is an orientation in which a direction in which the inner surface 21 of the first hollow cylinder 20 converges is an upward direction.

It is noted that it is not necessary for the hook device 2 to comprise a coil spring 40 for performing a biasing action on the clamping mechanism, particularly the second hollow cylinder 30. Instead, any other suitable type of biasing means may be used, including a leaf spring, for example.

The invention can be summarized as follows. A hook device 2 for hanging objects 3 such as picture frames comprises a housing 10 which has an internal space for allowing a carrier 4 for the hook device 2 to extend through the housing 10. In a practical embodiment, the housing 10 is provided with a projection 11 which is designed for functioning as a hanging hook. The hook device 2 further comprises a clamping mechanism for fixing the housing 10 on a carrier 4, wherein the clamping mechanism comprises a first hollow cylinder 20 having a tapered inner surface 21, a second hollow cylinder 30 carrying a number of balls 31 in openings 35 thereof, which extends through the first hollow cylinder at the position of the balls 31, and a coil spring 40 or another resilient element for biasing the second hollow cylinder 30 in a direction in which the inner surface 21 of the first hollow cylinder 20 converges. Furthermore, the hook device 2 is equipped with an actuating element 50 by means of which a user of the hook device 2 may force the second hollow cylinder 30 to move against the biasing action of the coil spring 40 in order to release the clamping mechanism. It is noted that the clamping mechanism functions in a way known per se, wherein the balls 31 are pressed against a carrier 4 extending through the hook device 2, particularly the second hollow cylinder 30, under the influence of the action of the coil spring 40 and contact to the tapered inner surface 21 of the first hollow cylinder 20.

In an axial direction, the first hollow cylinder 20 is retained in the housing 10 by form closure. The actuating element 50 has a function in preventing the coil spring 40 and the second hollow cylinder 30 from falling out of the housing 10 in the same direction, besides the function of allowing a user to move the second hollow cylinder 30 and releasing the clamping mechanism in that way. Due to these aspects of the invention, it is possible to have a housing 10 which is made of plastic. Also, it is possible to have a relatively simple design of the elements of the hook device 2, and to have a relatively simple assembling process of the hook device 2, so that costs can be saved. During the assembling process as mentioned, the first hollow cylinder 20 is inserted into the housing 10 through another opening 17 than the coil spring 40 and the second hollow cylinder 30, which opening 17 is especially provided for the purpose of having a passage for the first hollow cylinder 30 from outside of the housing 10 to inside the housing 10, wherein the first hollow cylinder 20 is moved in a radial direction, i.e. in a direction perpendicular to a longitudinal axis 7 of the hook device 2. This is different from the other elements 30, 40, 50 of the hook device 2, which are inserted into the housing 10 and coupled to the housing 10 at another position by moving them in an axial direction.

The invention claimed is:

1. A hook device for coupling an object to a carrier for the hook device and fixing a mutual position of the object and the carrier, the hook device comprising:
   a housing that has an internal space for allowing a carrier to extend through the housing;
   a clamping mechanism for fixing the housing on a carrier, the clamping mechanism comprising:
      a first hollow cylinder having two end faces and a tapered inner surface for delimiting an inner space of the first hollow cylinder, which first hollow cylinder is retained in the housing in an axial direction by form closure, the two end faces of the first hollow cylinder abutting against internal portions of the housing;
      a second hollow cylinder that is movably arranged in the housing in an axial direction; and
      biasing means that are arranged in the housing for biasing the second hollow cylinder in an axial direction, in a direction in which the inner surface of the first hollow cylinder converges; and
   an actuating element for releasing the clamping mechanism, the actuating element having elongated arms;
   wherein the second hollow cylinder extends through the first hollow cylinder, and is equipped with openings that provide access to an internal space of the second hollow cylinder from outside of the second hollow cylinder in a radial direction;
   wherein the housing is equipped with spaces;
   wherein an inner surface of the spaces is provided with a step; and
   wherein ends of the arms of the actuating element are provided with thickened portions that engage the steps in the housing in a non-actuated position of the actuating element, under the influence of the biasing means.

2. The hook device according to claim 1, wherein the housing is provided with an opening at the position of the first hollow cylinder of the clamping mechanism; and
   wherein a portion of an outer surface of the first hollow cylinder is accessible from outside of the housing, through the opening.

3. The hook device according to claim 1, wherein the clamping mechanism further comprises:
   balls that are located in the openings of the second hollow cylinder.

4. The hook device according to claim 1, wherein the biasing means comprise a coil spring.

5. The hook device according to claim 3, wherein the actuating element is movably arranged with respect to the housing, and is in contact with the second hollow cylinder to establish a movement of the second hollow cylinder in an axial direction in case of actuation, against the action of the biasing means.

6. The hook device according to claim 5, wherein the second hollow cylinder is secured against falling out of the housing on the basis of the contact with the actuating element.

7. The hook device according to claim 1, wherein an outer diameter of the second hollow cylinder is constant along a length of the second hollow cylinder.

8. The hook device according to claim 1, wherein the housing is free from internal screw thread.

9. The hook device according to claim 1, wherein the housing is manufactured from plastic.

10. The hook device according to claim 1, wherein both the first hollow cylinder and the second hollow cylinder are made from a metal (alloy).

11. The hook device according to claim 1, wherein the housing is provided with a projection that is adapted to serve as hanging hook.

12. A method for assembling a hook device for coupling an object to a carrier for the hook device and fixing a mutual position of the object and the carrier, comprising:

providing a housing that has an internal space for allowing a carrier for the hook device to extend through the housing;

providing a first hollow cylinder having a tapered inner surface, a second hollow cylinder and a number of balls that are located in openings of the second hollow cylinder, a spring element, and an actuating element having elongated arms;

inserting the first hollow cylinder into the housing through an opening in the housing, wherein the spring element and the second hollow cylinder with the balls are successively inserted into the housing through another opening in the housing; and inserting the arms of the actuating element into the housing in yet other openings in the housing.

13. The method according to claim 12 further comprising moving the first hollow cylinder in a radial direction in the process of insertion into the housing.

14. The method according to claim 12, wherein the first hollow cylinder is inserted into the housing through a movement in a first direction with respect to the housing; and wherein the spring element, the second hollow cylinder with the balls, and the arms of the actuating element are inserted into the housing through a movement in a second direction with respect to the housing.

15. A hook device for coupling an object to a carrier for the hook device and fixing a mutual position of the object and the carrier, the hook device comprising:

a housing that has an internal space for allowing a carrier to extend through the housing;

a clamping mechanism for fixing the housing on a carrier, the clamping mechanism comprising:

a first hollow cylinder having two end faces and a tapered inner surface for delimiting an inner space of the first hollow cylinder, which first hollow cylinder is retained in the housing in an axial direction by form closure, the two end faces of the first hollow cylinder abutting against internal portions of the housing;

a second hollow cylinder that is movably arranged in the housing in an axial direction, that extends through the first hollow cylinder, and that is equipped with openings that provide access to an internal space of the second hollow cylinder from outside of the second hollow cylinder in a radial direction;

balls that are located in the openings of the second hollow cylinder; and biasing means that are arranged in the housing for biasing the second hollow cylinder in an axial direction, in a direction in which the inner surface of the first hollow cylinder converges; and actuating means for releasing the clamping mechanism, comprising an actuating element that is movably arranged with respect to the housing, and that is in contact with the second hollow cylinder to establish a movement of the second hollow cylinder in an axial direction in case of actuation, against the action of the biasing means;

wherein the second hollow cylinder is secured against falling out of the housing on the basis of the contact with the actuating element;

wherein the actuating element has elongated arms;

wherein the housing is equipped with spaces;

wherein an inner surface of the spaces is provided with a step; and wherein ends of the arms of the actuating element are provided with thickened portions that engage the steps in the housing in a non-actuated position of the actuating element, under the influence of the biasing means.

* * * * *